United States Patent [19]
Lallo et al.

[11] Patent Number: 5,378,109
[45] Date of Patent: * Jan. 3, 1995

[54] CO-CURED COMPOSITE FAN BLADE AND METHOD

[75] Inventors: Arthur J. Lallo, Edgmont; Thomas J. Falasco, Broomall, both of Pa.

[73] Assignee: The Boeing Company, Seattle, Wash.

[*] Notice: The portion of the term of this patent subsequent to Sep. 3, 2010 has been disclaimed.

[21] Appl. No.: 750,585

[22] Filed: Aug. 28, 1991

Related U.S. Application Data

[63] Continuation-in-part of Ser. No. 589,652, Sep. 28, 1990, Pat. No. 5,248,242.

[51] Int. Cl.$^6$ .................... B64C 27/46; B23P 15/04
[52] U.S. Cl. ............................. 416/226; 156/245
[58] Field of Search ............... 156/245, 156; 416/226, 416/230; 29/156.8 P

[56] References Cited

U.S. PATENT DOCUMENTS

| | | | |
|---|---|---|---|
| 3,552,881 | 1/1971 | Rogers et al. | 416/226 |
| 3,967,996 | 7/1976 | Kamov et al. | 416/226 |
| 4,095,322 | 6/1978 | Scarpati et al. | 416/226 |
| 4,188,171 | 2/1980 | Baskin | 416/226 |
| 4,247,255 | 1/1981 | De Rosa | 416/226 |
| 4,298,417 | 11/1981 | Euler et al. | 156/245 |
| 4,650,534 | 3/1987 | Mussi | 156/245 |
| 4,806,077 | 2/1989 | Bost | 416/226 |

*Primary Examiner*—David Brown
*Attorney, Agent, or Firm*—Jones, Tullar & Cooper

[57] ABSTRACT

This invention relates to an aerodynamic blade assembly and method by which the blade is formed in a single cure cycle. A foam core having an aerodynamic shape is provided on which an inner spar wrap member, an upper spar pack member, a lower spar pack member, a lower outer spar wrap member, an upper outer spar wrap member, a leading edge block and a trailing edge wedge are laid-up from fiber-reinforced composite material. The total lay-up assembly with the core is placed in a mold tool and the tool heated to thereby cure and structuralize the total lay-up assembly to form the blade.

9 Claims, 2 Drawing Sheets

CO-CURED COMPOSITE FAN BLADE AND METHOD

CROSS-REFERENCE TO RELATED APPLICATION

This application is a continuation-in-part application of application, Ser. No. 07/589,652, filed Sept. 28, 1990 now U.S. Pat No. 5,248,242.

BACKGROUND OF THE INVENTION

1. Field of the Invention

This invention relates to the field of products manufactured from fiber-reinforced elastomeric resin, particularly to techniques for fabricating such products, especially rotor blades formed in one cycle at elevated temperature and pressure.

2. Description of the Prior Art

Conventional helicopter aerodynamic rotor blades (main rotor and tail rotor), fabricated of composite materials and having fiber-reinforced elastomeric resign, require multiple cure cycles at elevated temperature and pressure lasting several hours in order to form the shape of the components of the blade assembly. During these cure cycles, the resin of the composite material polymerizes to optimal structural stiffness and strength, provided temperature is controlled and varied over the length of the cycle in accordance with a defined schedule usually set by the manufacturer's specifications. Positive pressure applied to the material helps to force air from the components to ambient atmosphere outside the tool in which the components are formed.

This technique requires carefully sizing many laminae of composite material in a precured condition cut from raw stock to precise dimensions. Each component requires a molding tool, into which precured laminae are placed, sealed by a plastic bag enveloping the tool, and pressurized during the cure cycle. Usually the components are cured in an autoclave/or large furnace having a sealed chamber whose pressure is increased in order to induce air to escape the laminae during the cure cycle. This process requires careful control of temperature and pressure to the requirements of the cure cycle. Typically temperature is raised to 250 degrees F and pressure to 85 psi.

U.S. Pat. No. 4,095,322 describes a helicopter main rotor blade fabricated from composite material of fiber-reinforced resin. The method of fabrication requires several cure cycles at high temperature and pressure to form individual components and a final cure cycle during which the components are held in position and bonded to form an assembly. The structure of the rotor blade and aft fairing, a subassembly of the blade assembly, described in U.S. Pat. No. 4,316,701 are compatible with the fabrication method of the '322 patent.

However, various resins and bonds produced by different manufacturers require different cure cycle conditions to satisfy manufacturer's specifications and to realize optimal structural properties. A fabricator using diverse materials must carefully control operation of the autoclave so that products being cured and/or bonded there are compatible with the temperature cycle being used.

A helicopter tail rotor blade, or fan blade, fabricated in the conventional way includes in its essential elements a leading edge cap forming the nose or leading edge of the airfoil, a spar assembly and a trailing edge. Each of these components requires a separate cure and molding tool to produce acceptable dimensional tolerance control and physical properties. After these components are fabricated, they are bonded to other components to form subassemblies, which are subsequently placed in a molding tool or fixture and bonded to other subassemblies while other components are being cured.

For example, the spar packs are bonded to the leading edge cap to produce a subassembly comprising the forward portion of the airfoil contour. Thereafter, the spar-leading edge subassembly is bonded to the spare core subassembly to form the major portion of the blade, exclusive of the trailing edge. A trailing edge block is fabricated separately and then bonded to the rearward edge of the core, or formed and bonded integrally with the core in a single cure cycle.

Time, complexity and cost to produce rotor blades using multiple cure and bonding cycles are prohibitive.

SUMMARY OF THE INVENTION

The principal structural components of an aerodynamic blade according to the present invention are made of fiber-reinforced composite material. For a helicopter tail rotor, for example, these components according to the present invention include: a core, a spar, spar wraps, spar packs, leading edge block and a trailing edge wedge each, with the exception of the core, cut as lamina from raw stock into flat sheets in the precured condition. Each lamina of the requisite dimensions is laid upon other such lamina of the component in sufficient number until the desired thickness dimension of the component being fabricated is produced, the entire assembly taking place on the core. During the process of laying-up the laminae sequentially, the material and direction of the reinforcing fibers can be varied intentionally among the components and within a particular component so that the finished product has the structural properties associated with the intended fiber direction.

A leading edge cap made of metal or fiber-reinforced composite material may also be provided, and it along with the trailing edge block serve to complete the desired aerodynamic shape and size of the blade in a precured condition.

A molding tool, having complementary parts with one part having the contour of the upper blade surface and the other part having the contour of the lower blade surface, each part adapted for assembly together so that their inner surfaces envelop the outer blade surface, are formed and adapted to receive the components of the blade therein.

The uncured components in the form of a total lay-up assembly with the core as part of the assembly are placed in the proper order and position in one part of the molding tool, the other part of the molding tool is placed over the first part, and the unit is sealed. Preferably the part having the upper blade contour is placed on a worktable with its inner surface facing upward. The total lay-up is placed in this part and the tool closed and subjected to heat to thereby cure the total lay-up resulting in a structuralization of the total lay-up into the desired blade.

BRIEF DESCRIPTION OF THE DRAWING

The invention is described in more detail with reference to the embodiment illustrated in the following drawings.

DESCRIPTION OF THE PREFERRED EMBODIMENT

The tail rotor or fan blade fabrication begins with the provision of a foam core 10. Preferably, an oversize one-piece Rohacell foam core, which is a heat formed special density foam material manufactured by the Rohn Co.

Figure 1:
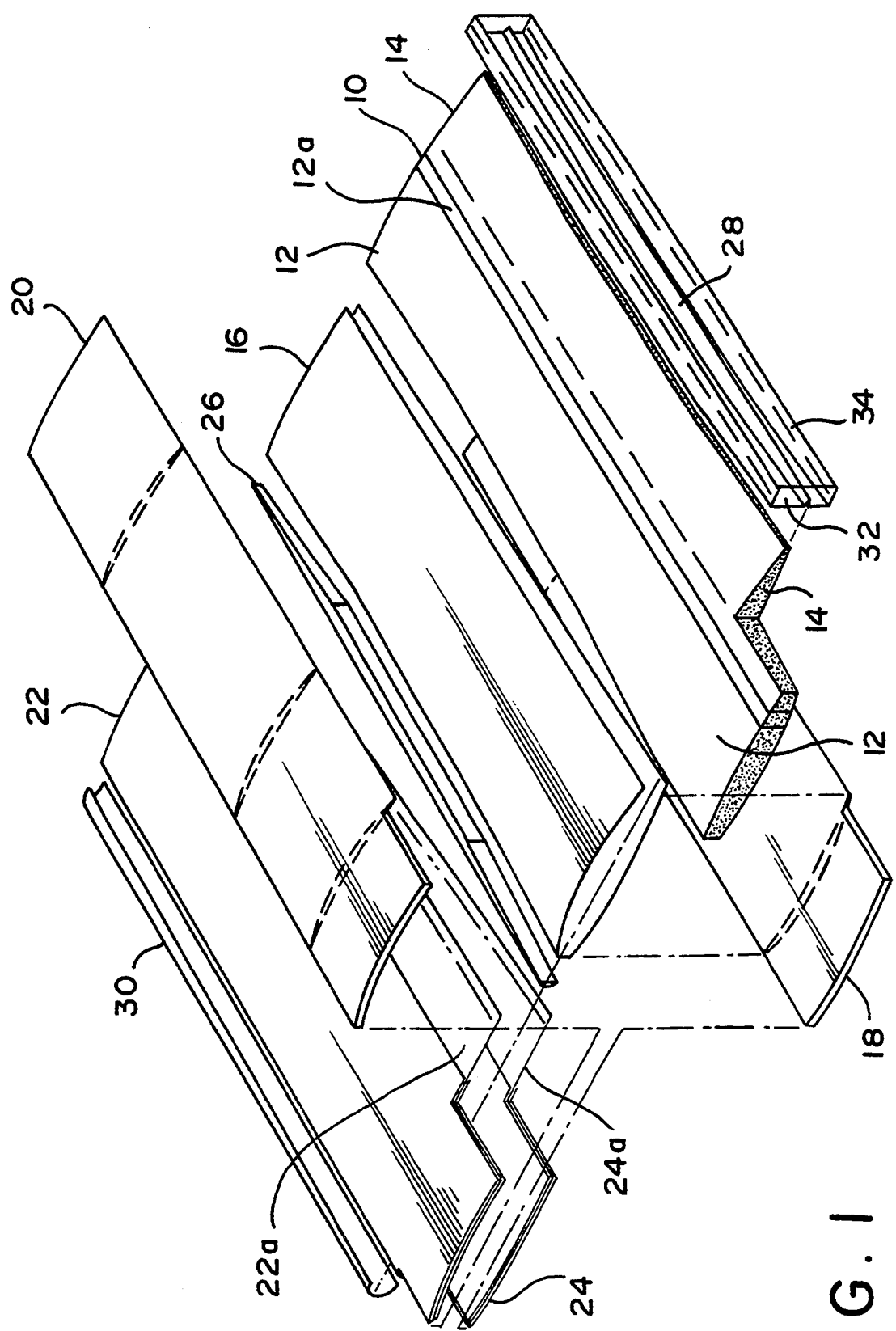
FIG. 1 is an exploded isometric illustration of a tail rotor blade viewed from above its upper surface from the root toward the tip.

The core 10 has an airfoil shape in the transverse or chordwise direction and a spanwise or longitudinal length equal to the length of the blade to be formed. It includes a spar portion 12 and a trailing edge portion 14, shown separated by the dash line in FIG. 1. The spar portion 12 includes a transition strip 12a. The spar portion 12 and trailing edge portion 14 preferably have the same density. For example, both of these portions may have a density of 2 lbs/ft$^3$ while the transition strip has a density of 18 lbs/ft$^3$. The transition strip has a higher density because it serves as a major load carrying member, somewhat like the spar heel portion of a main rotor blade.

The blade is fabricated employing the core 10, an inner spar wrap 16, a lower spar pack 18, an upper spar pack 20, an upper outer spar wrap 22, a lower outer spar wrap 24, a leading edge block 26, a trailing edge wedge 28 and a leading edge cap 30.

The upper and lower outer spar wraps 22 and 24 each have a full chordwise extent, i.e., they cover both the spar portion 12, including the transition strip 12a and the trailing edge portion 14 of the core 10. The inner spar wrap 16, lower spar pack 18 and upper spar pack 20 have a limited chordwise extent, i.e., they cover essentially only the spar portion 12, including the transition strip 12a of the core 10. The inner spar wrap 16, lower spar pack 18, upper spar pack 20 and part of the upper and lower outer spar wraps 22 and 24 extend essentially the full longitudinal extent of the spar portion 12, including the transition strip 12a, i.e., they have essentially the same spanwise extent. While the upper and lower outer spar wraps 22 and 24 extend essentially the full longitudinal length of the spar portion 12, including the transition strip 12a, with their parts 22a and 24a extending essentially the full longitudinal length of the trailing edge portion 14.

The leading edge block 26 is attached to the leading edge of the core 10 and the leading edge cap 30 is attached to the leading edge of the blade. The trailing edge wedge 28 and appropriate upper and lower fillers 32 and 34, respectively are attached to the trailing edge of the core 10. The upper and lower fillers 32 and 34, provide structural continuity across the butt joint between the trailing edge block and the upper and lower spar wrap parts 22a and 24a. Similar fillers may be used with the leading edge block.

The leading edge cap 30 may be fabricated of fiber-reinforced composite material, or it may be made of metal, such as nickel. If made of metal, the leading edge cap is adhered to the leading edge of the blade formed by the various spar packs and wraps by any of the known adhesives used for this purpose. The remaining parts of the blade, i.e., the inner spar wrap 16, the lower and upper spar packs 18 and 20, the lower and upper spar wraps 22 and 24, the leading edge block 30, the trailing edge wedge 28 and the trailing edge wedge fillers 32 and 34 are all fabricated of fiber-reinforced composite material. Each of these remaining parts, and the leading edge cap, if made of fiber-reinforced composite material, are fabricated by building-up multiple layers of the fiber-reinforced composite material directly onto the core 10, which serves as a mandrel for fabrication. The build-up progresses to the desired thickness with the fiber orientation in each layer of the build-up being uniform (uni-directional) or skewed with the angular relationship of the fibers in each of the layers being totally arbitrary or, preferably at a fixed angle, such as 45°, i.e., one or more layers may have the fibers all oriented in the longitudinal direction of the core 10, while the next layer or next several layers may have the fibers crossed, i.e., oriented at an angle of ±45° to the longitudinal axis of the core 10.

Figure 2:
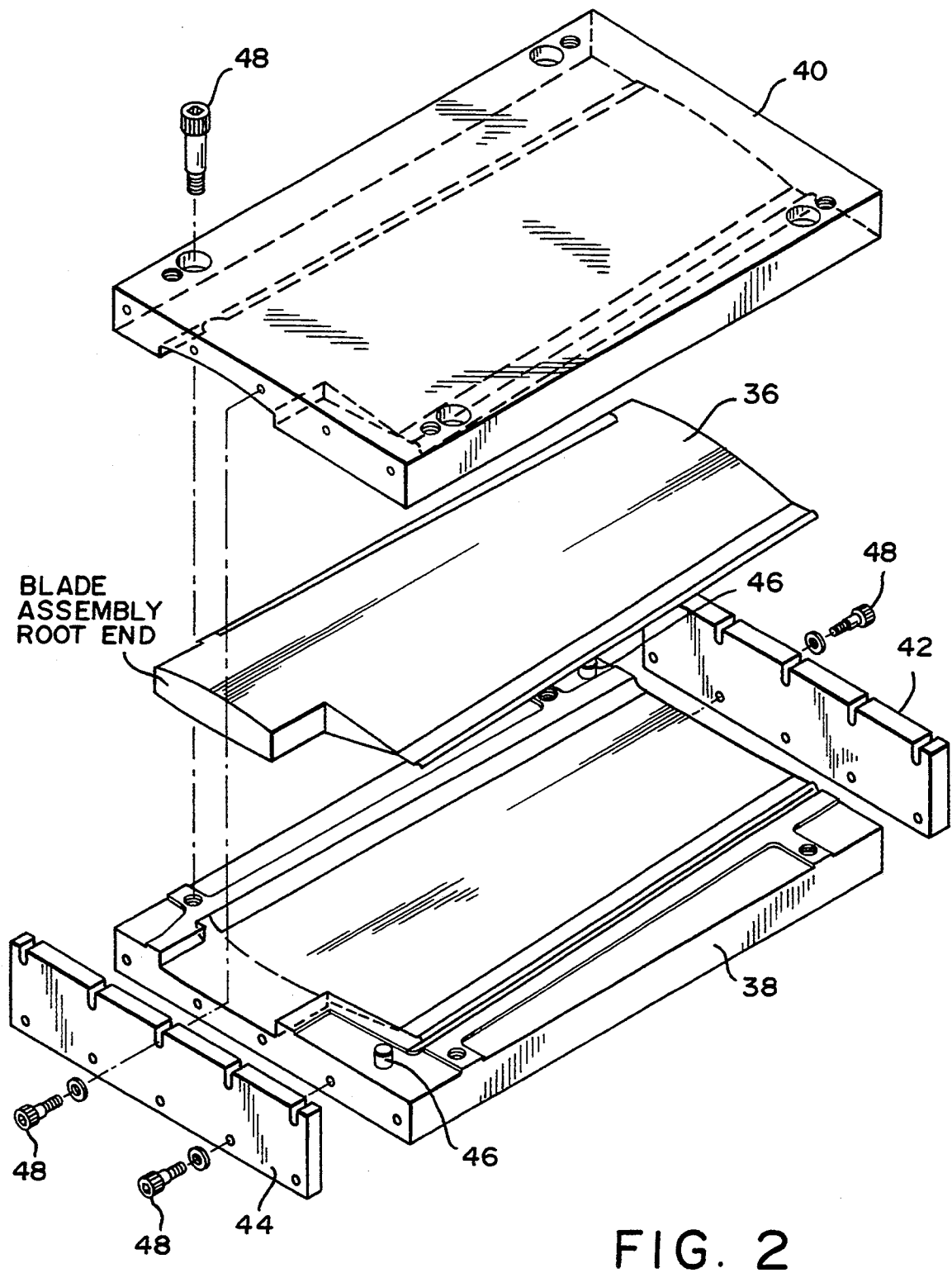
FIG. 2 is a cross section of a tail rotor blade located in two molding tool portions, whose inner surfaces have the size and contour of the surface of the tail rotor blade when the tool portions are positioned as shown during the, cure cycle.

At the completion of each build-up, which may be achieved manually, or automatically using, for example, the tape laying heads disclosed in U.S. Pat. Nos. 4,560,433 or 5,015,326, the assembled total lay-up 36 (FIG. 2) with the core 10, but without the leading edge cap, if the leading edge cap is made of metal, is placed in a tool comprising a lower mold 38, an upper mold 40 and end plates 42 and 44. The lower mold 38 has at least two aligning pins 46 for aligning the upper mold 40 to the lower mold 38. Bolts 48 are provided for fastening the upper mold to the lower mold and the end plates to the assembled upper and lower mold.

Subsequent to placing the total lay-up 36 in the tool the various parts of the tool are fastened together such that an initial compression of the lay-up between the oversized core and the molds and side plates removes air from between the various layers. The loaded tool is then heated and the total lay-up 36 thus subjected to a curing cycle during which time the adhesive and epoxy resin in the layers, or laminates, of fiber-reinforced material polymerize and mutually bond. Bonding also occurs due to any adhesive use, such as the adhesive used to attach the leading edge block, the trailing edge wedge and the various fillers.

Polymerization is evidenced physically by the stiffening and strengthening of adhesive and resin, creation of a high strength bond among contiguous components, wetting and mutual bonding of the fibers by the resin in which they are carried, and disappearance of the tacky adherence characteristic of adhesive and resin (structuralization). When the materials from which the components are formed are shipped by the manufacturer to the fabricator and before the components are cured in the molding tool, the resin in the laminates of the fiber reinforced composite material and the adhesive are partially polymerized (the uncured condition). In this condition, they are tacky and adhere readily to other laminates of the assembly. This attribute assures dimensional stability and location of lamina during the process of forming the various components to a desired thickness and laying each component on another component on the mandrel.

After the total lay-up 36 is structuralized due to the action of heat and pressure and the resulting polymerization, it is removed from the tool and the leading edge cap adhered, as noted above, and, for example, a root-end attachment applied to the blade at its longitudinal root end. The blade is then complete and ready for mounting onto a rotor hub, for example, of a helicopter tail rotor assembly.

What is claimed is:

1. An aerodynamic blade assembly fabricated of fiber-reinforced resin composite material, having outer surfaces in the form of an airfoil, having a leading edge, a trailing edge, radial length and depth, comprising:

a foam core having a spar portion and a trailing edge portion which together define outer surfaces in the form of an airfoil, said spar portion defining a leading edge and said trailing edge portion defining a trailing edge;

a spar including an inner spar wrap member covering the outer surfaces of the foam core defining the spar portion, an upper spar pack and a lower spar pack each contacting a corresponding outer surface of the inner spar wrap member, an upper outer spar wrap member contacting the outer surface of the upper spar pack, and a lower outer spar wrap member contacting the outer surface of the lower spar pack;

a leading edge block contacting said leading edge; and a trailing edge wedge member contacting said trailing edge.

2. The aerodynamic blade assembly of claim 1, wherein the upper outer spar wrap member includes a part which covers the outer upper surface of the foam core defining the trailing edge portion, and the lower outer spar wrap member includes a part which covers the outer lower surface of the foam core defining the trailing edge portion.

3. The aerodynamic blade assembly of claim 1, further comprising:

a leading edge cap engaging the outer surface of the upper spar wrap member and the outer surface of the lower spar wrap member adjacent said leading edge.

4. The aerodynamic blade assembly of claim 1, wherein said foam core includes a transition strip between the spar portion and the trailing edge portion, and wherein the density of the transition strip is different from that of the spar portion and the trailing edge portion.

5. The aerodynamic blade assembly of claim 4, wherein the density of the spar portion and the trailing edge portion are the same.

6. A method for fabricating an aerodynamic blade assembly from fiber-reinforced resin composite material, comprising the steps of:

providing a single piece foam core having a spar portion and a trailing edge portion which together define outer surfaces in the form of an airfoil, said single piece foam core also defining a leading edge and a trailing edge;

laying-up fiber-reinforced composite material to cover the outer surfaces of the foam core defining the spar portion to thereby form an inner spar wrap;

laying-up fiber-reinforced composite material to cover the outer surface of one side of the inner spar wrap to thereby form a lower spar pack;

laying-up fiber-reinforced composite material to cover the outer surface of the other side off the inner spar wrap to thereby form an upper spar pack;

laying-up fiber-reinforced composite material to cover the outer surface of the lower spar pack and lower outer surface of the trailing edge portion to thereby form a lower outer spar wrap;

laying-up fiber-reinforced composite material to cover the outer surface of the upper spar pack and upper outer surface of the trailing edge portion to thereby form an upper outer spar wrap;

laying-up fiber-reinforced composite material in contact with the leading edge of the foam core to thereby form a leading edge block; and laying-up fiber-reinforced composite material in contact with the trailing edge of the foam core to thereby form a trailing edge wedge, said foam core, inner spar wrap, lower spar pack, upper spar pack, lower outer spar wrap, upper outer spar wrap, leading edge block and trailing edge wedge forming a total lay-up assembly of the aerodynamic blade assembly.

7. The method as defined in claim 6, further comprising the steps of:

placing the total lay-up assembly in a tool; and
heating the tool to thereby cure and structuralize the total lay-up.

8. The method as defined in claim 7, further comprising the step of:

placing and adhering a leading edge cap onto the leading edge of the structuralized total lay-up.

9. An aerodynamic blade assembly fabricated of fiber-reinforced resin composite material, having outer surfaces in the form of an airfoil, having a leading edge, a trailing edge, radial length and depth, comprising:

a foam core having a spar portion and a trailing edge portion which together define outer surfaces in the form of an airfoil, said spar portion defining a leading edge and said trailing edge portion defining a trailing edge;

a spar including an inner spar wrap member covering the outer surfaces of the foam core defining the spar portion, an upper spar pack and a lower spar pack each contacting a corresponding outer surface of the inner spar wrap member, an upper outer spar wrap member contacting the outer surface of the upper spar pack, and a lower outer spar wrap member contacting the outer surface of the lower spar pack;

a leading edge block contacting said leading edge;

a trailing edge wedge member contacting said trailing edge;

an upper trailing edge filler member engaging the outer adjacent surfaces of the trailing edge wedge and the outer surface of said part of said upper outer spar wrap; and a lower trailing edge filler member engaging the outer adjacent surfaces of the trailing edge wedge and the outer surface of said part of said lower outer spar wrap.

* * * * *

UNITED STATES PATENT AND TRADEMARK OFFICE
CERTIFICATE OF CORRECTION

PATENT NO. : 5,378,109
DATED : January 3, 1995
INVENTOR(S) : Arthur J. Lallo et al It is certified that error appears in the above-indentified patent and that said Letters Patent is hereby corrected as shown below:

Claim 6, column 6, line 2, "off" should be "of".

Signed and Sealed this

Twenty-fifth Day of April, 1995

Attest:

BRUCE LEHMAN

*Attesting Officer*     *Commissioner of Patents and Trademarks*